United States Patent
Guo et al.

(10) Patent No.: US 11,756,332 B2
(45) Date of Patent: Sep. 12, 2023

(54) IMAGE RECOGNITION METHOD, APPARATUS, DEVICE, AND COMPUTER STORAGE MEDIUM

(71) Applicant: Beijing Baidu Netcom Science and Technology Co., Ltd., Beijing (CN)

(72) Inventors: Zhizhi Guo, Beijing (CN); Yipeng Sun, Beijing (CN); Jingtuo Liu, Beijing (CN); Junyu Han, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 310 days.

(21) Appl. No.: 17/208,568

(22) Filed: Mar. 22, 2021

(65) Prior Publication Data

US 2021/0209343 A1 Jul. 8, 2021

(30) Foreign Application Priority Data

Jun. 30, 2020 (CN) .......................... 202010611133.8

(51) Int. Cl.
*G06V 40/10* (2022.01)
*G06V 40/16* (2022.01)
(Continued)

(52) U.S. Cl.
CPC ............ *G06V 40/171* (2022.01); *G06F 18/10* (2023.01); *G06F 18/29* (2023.01); *G06N 3/045* (2023.01);
(Continued)

(58) Field of Classification Search
CPC .. G06V 40/171; G06V 10/764; G06V 10/806; G06V 10/82; G06F 18/10;
(Continued)

(56) References Cited

U.S. PATENT DOCUMENTS 8,345,114 B2 * 1/2013 Ciuc .................. G06T 11/60
348/222.1
2018/0350071 A1 * 12/2018 Purwar ............... G06V 10/454

FOREIGN PATENT DOCUMENTS

CN 101127076 A 2/2008
CN 108921825 A 11/2018
(Continued)

OTHER PUBLICATIONS

Chen, Min, et al. "AI-Skin: Skin disease recognition based on self-learning and wide data collection through a closed-loop framework." Information Fusion 54 (2020): 1-9. (Year: 2020).*
(Continued)

*Primary Examiner* — Fayyaz Alam
(74) *Attorney, Agent, or Firm* — Husch Blackwell LLP (57) ABSTRACT

The present application discloses an image recognition method, apparatus, device, and a computer storage medium, which is related to a technical field of artificial intelligence, and in particular, to a technical field of image processing. The method includes: performing organ recognition on a human face image and marking positions of the human facial five sense organs in the human face image, obtaining a marked human face image; inputting the marked human face image into a backbone network model and performing feature extraction, obtaining defect features of the marked human face image outputted by different convolutional neural network levels of the backbone network model; and fusing the defect features of different levels that are located in a same area of the human face image, obtaining a defect recognition result of the human face image.

12 Claims, 7 Drawing Sheets

(51) Int. Cl.

| | |
|---|---|
| *G06N 3/08* | (2023.01) |
| *G06F 18/10* | (2023.01) |
| *G06F 18/20* | (2023.01) |
| *G06N 3/045* | (2023.01) |
| *G06V 10/764* | (2022.01) |
| *G06V 10/80* | (2022.01) |
| *G06V 10/82* | (2022.01) |

(52) U.S. Cl.
CPC ............. *G06N 3/08* (2013.01); *G06V 10/764* (2022.01); *G06V 10/806* (2022.01); *G06V 10/82* (2022.01)

(58) Field of Classification Search
CPC ....... G06F 18/29; G06F 18/253; G06N 3/045; G06N 3/08
See application file for complete search history.

(56) References Cited

FOREIGN PATENT DOCUMENTS

| | | |
|---|---|---|
| JP | 2014164573 A | 9/2014 |
| JP | 2017033529 A | 2/2017 |
| WO | 2020113326 A1 | 6/2020 |

OTHER PUBLICATIONS

Hameed, Nazia, Antesar Shabut, and M. Alamgir Hossain. "A Computer-aided diagnosis system for classifying prominent skin lesions using machine learning." 2018 10th computer science and electronic engineering (CEEC). IEEE, 2018. (Year: 2018).*

Ahmad, Belal, et al. "Discriminative feature learning for skin disease classification using deep convolutional neural network." IEEE Access 8 (2020): 39025-39033. (Year: 2020).*

Choi, Sung Eun, et al. "Age estimation using a hierarchical classifier based on global and local facial features." Pattern recognition 44.6 (2011): 1262-1281. (Year: 2011).*

Ng Choon-Ching Tel Al: "Will Wrinkle Estimate the Face Age?", 2015 IEEE International Conference ON Systems, Man, and Cybernetics, IEEE, Oct. 9, 2015 (Oct. 9, 2015), pp. 2418-2423, CP032847509, DOI: 10.1109/SMC.2015.423.

Ng Choon-Ching et al: "Hybrid Ageing Patterns for face age estimation", Image and Vision Computing, Elsevier, Guildford, GB, vol. 69, Sep. 6, 2017 (Sep. 6, 2017), pp. 92-102, CP085413065, ISSN: 0262-8856, DOI: 10.1016/J.IMAVIS.2017.08.005.

Ng Choon-Ching: "Face age estimation using wrinkle patterns", Jan. 1, 2015 (Jan. 1, 2015), XP055569949, Retrieved from the Internet: URL: https://e-space.mmu.ac.uk/595499/1/Choon-Ching%20Ng%20-%20PhD%20Thesis%202015.pdf.

Shin Il-Kyu et al: "Extraction and Transfer of Facial Expression Wrinkles for Facial Performance Enhancement", Pacific Graphics (2014), Oct. 10, 2014 (Oct. 10, 2014), XP0558376700, Retrieved from Internet: URL: https://cgl.ethz.ch/Downloads/Publications/Papers/2014/0zt14a/0zt14a.pdf.

Ng Choon-Ching et al: "Wrinkle Detection Using Hessian Line Tracking", IEEE Access, vol. 3, Jul. 28, 2015 (Jul. 28, 2015), pp. 1079-1088, XP011664465, DOI: 10.1109/ACCESS.2015.2455871.

Ng Choon-Ching et al: "Automatic Wrinkle Detection Using Hybrid Hessian Filter" In: "Lecture Notes in Computer Science", Jan. 1, 2015 (Jan. 1, 2015), Springer Berlin Heidelberg, Berlin, Heidelberg, XP055207995, ISSN: 0302-9743, ISBN: 978-3-54-045234-8, vol. 9005, pp. 609-622, DOI: 10.1007/978-3-319-16811-1_40.

Saha Sumit: "A Comprehensive Guide to Convolutional Neural Networks—the ELI5 way / by Sumit Saha / Towards Data Science", Dec. 15, 2018 (Dec. 15, 2018), XP093005628, Retrieved from the Internet: URL:https://towardsdatascience.com/a-comprehensive-guide-to-convolutional-neural-networks-the-eli5-way-3bd2b1164a53.

* cited by examiner

IMAGE RECOGNITION METHOD, APPARATUS, DEVICE, AND COMPUTER STORAGE MEDIUM

CROSS-REFERENCE TO RELATED APPLICATION

This application claims priority to Chinese Patent Application No. 202010611133.8, filed on Jun. 30, 2020, which is hereby incorporated by reference in its entirety.

TECHNICAL FIELD

The present application relates to a field of artificial intelligence, and in particular, to a technical field of image processing.

BACKGROUND

With the development of computer technology, image processing and image recognition technologies are becoming more and more intelligent. In the field of image recognition, human face recognition and human body recognition can be performed by means of artificial intelligence. Image processing technologies are also gradually applied in more and more fields, such as security check, access control, news, and healthcare.

SUMMARY

The present application provides an image recognition method, apparatus, device, and storage medium.

According to an aspect of the present application, there is provided an image recognition method, including:
performing organ recognition on a human face image and marking positions of the human facial five sense organs in the human face image, obtaining a marked human face image;
inputting the marked human face image into a backbone network model and performing feature extraction, obtaining defect features of the marked human face image outputted by different convolutional neural network levels of the backbone network model; and
fusing the defect features of different levels that are located in a same area of the human face image, obtaining a defect recognition result of the human face image.

According to another aspect of the present application, there is provided an image recognition apparatus, including:
a marking module, configured for performing organ recognition on a human face image and marking positions of the human facial five sense organs in the human face image, obtaining a marked human face image;
an extraction module, configured for inputting the marked human face image into a backbone network model and performing feature extraction, obtaining defect features of the marked human face image outputted by different convolutional neural network levels of the backbone network model; and
a fusion module, configured for fusing the defect features of different levels that are located in a same area of the human face image, obtaining a defect recognition result of the human face image.

According to another aspect of the present application, there is provided an electronic device, including:
at least one processor; and
a memory in communication connection with the at least one processor; wherein
the memory has instructions executable by the at least one processor stored therein, the instructions, when executed by the at least one processor, enable the at least one processor to perform the method provided in any embodiment of the present application.

According to another aspect of the present application, there is provided a non-transitory computer-readable storage medium having computer instructions stored therein, the computer instructions, when executed by a computer, cause the computer to execute the method provided in any embodiment of the present application.

It should be understood that the content described in this section is not intended to identify key or important features of embodiments of the present application, nor is it used to limit the scope of the present application. Other features of the present application will be easily understood through the following description.

BRIEF DESCRIPTION OF THE DRAWINGS

The accompanying drawings are used to better understand the present solution and do not constitute a limitation to the present application, wherein.

DETAILED DESCRIPTION

The exemplary embodiments of the present application will be described below in combination with the accompanying drawings, including various details of the embodiments of the present application to facilitate understanding, which should be considered as exemplary only. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

It should be noted that the embodiments in the present application and the features in the embodiments may be combined with each other so long as there is no conflict.

In the healthcare field, image recognition technologies can be used to recognize defects on a human face, such as spots, pimples, and moles. In such application field, how to improve recognition accuracy is a problem that needs to be solved.

Figure 1:
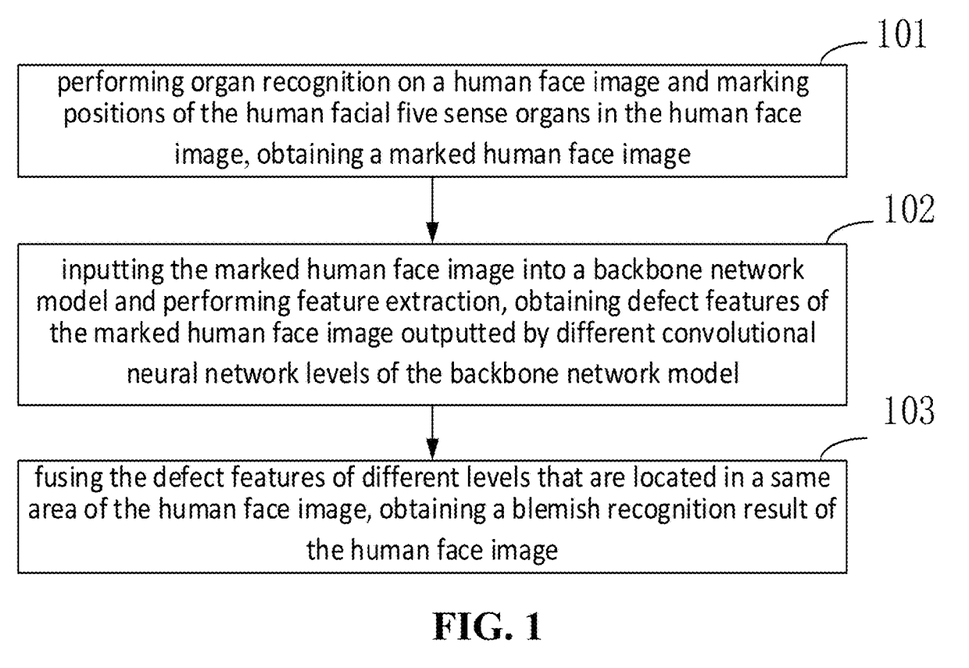
FIG. 1 is a schematic diagram of an image recognition method according to an embodiment of the present application.

FIG. 1 shows an image recognition method according to an embodiment of the present application, including:

step 101: performing organ recognition on a human face image and marking positions of the human facial five sense organs in the human face image, obtaining a marked human face image;

step 102: inputting the marked human face image into a backbone network model and performing feature extraction, obtaining defect features of the marked human face image outputted by different convolutional neural network levels of the backbone network model; and step 103: fusing the defect features of different levels that are located in a same area of the human face image, obtaining a defect recognition result of the human face image.

The technology according to the present application can improve the efficiency and accuracy of recognition of human facial defects.

In this embodiment, the human face image may be a preprocessed image of a human face image that needs to be processed. Performing organ recognition on the preprocessed human face image may include identifying areas where the five sense organs are located in the human face image, for example, identifying an eyeball area, a nose area, an eyebrow area, a cheek area, and a mouth area.

In this embodiment, the backbone network model has multiple convolutional neural network levels. For example, the backbone network model has four convolutional neural network levels, the marked human face image is copied in quadruplicates, which are inputted respectively into the four convolutional neural network levels, to obtain a defect feature outputted by each convolutional neural network level.

In one implementation, the fusing defect features of different levels that are located in a same area of the human face image may consist in linear summation of defect feature values of different levels in the same area of the human face image. The defect feature values may be image feature values of human face image areas having defects.

In the embodiment of the present application, the human face image is preprocessed, and then the preprocessed human face image is subjected to facial organ recognition, recognition of defects is combined with recognition of facial organs, and defect features of the marked human face image are outputted at the same time through multiple convolutional neural network levels in the backbone network model, so as to improve the accuracy of defect recognition.

The embodiment of the present application designs an input-to-output skin defect detection method, which directly detects different types of skin defects (such as spots, pimples, and moles), and is able to greatly improve detection accuracy and system robustness.

Figure 2:
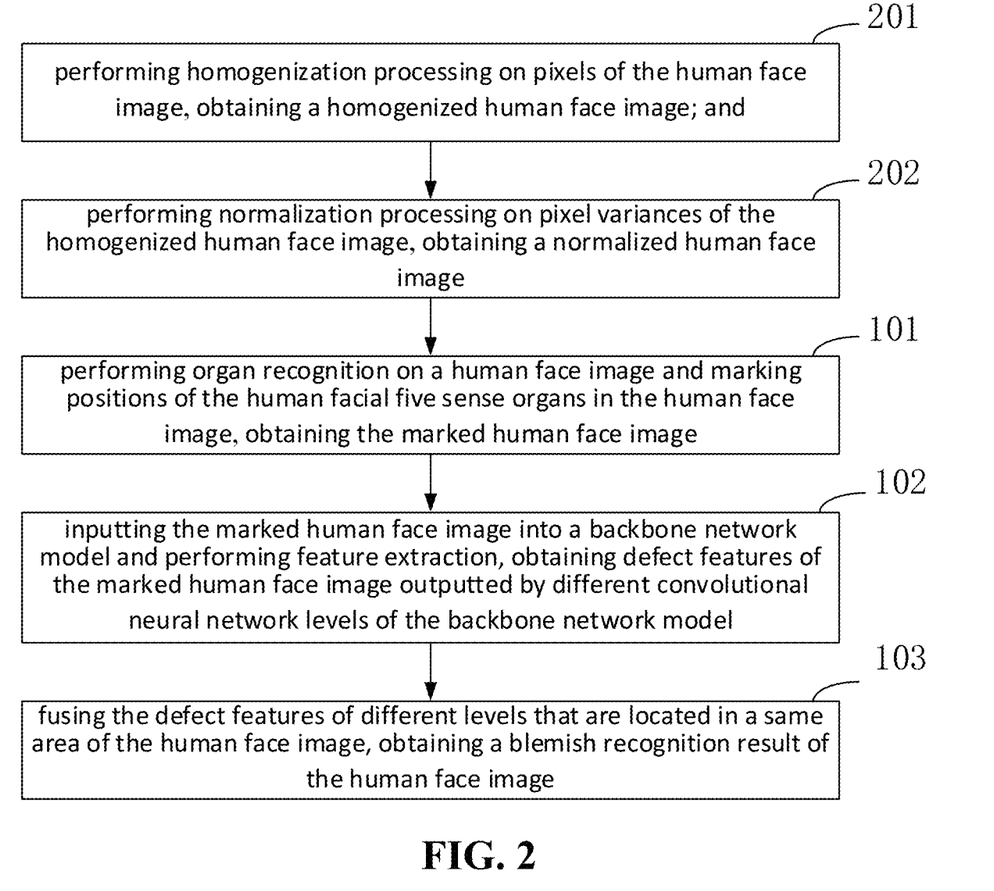
FIG. 2 is a schematic diagram of an image recognition method in a specific scenario according to an embodiment of the present application.

In another implementation, the image recognition method further includes the steps shown in FIG. 1. In this embodiment, before the step 101, as shown in FIG. 2, the image recognition method further includes:

step 201: performing homogenization processing on pixels of the human face image, obtaining a homogenized human face image; and step 202: performing normalization processing on pixel variances of the homogenized human face image, obtaining a normalized human face image.

In this embodiment, the performing homogenization processing on pixels of the human face image, obtaining a homogenized human face image, may specifically include: performing homogenization processing on pixel values of the human face image. The pixels are adjusted in accordance with a set pixel value. If a pixel value is higher than the set pixel value, the corresponding pixel value will be adjusted downward; if a pixel value is lower than the set pixel value, the corresponding pixel value will be adjusted upward.

Figure 3:
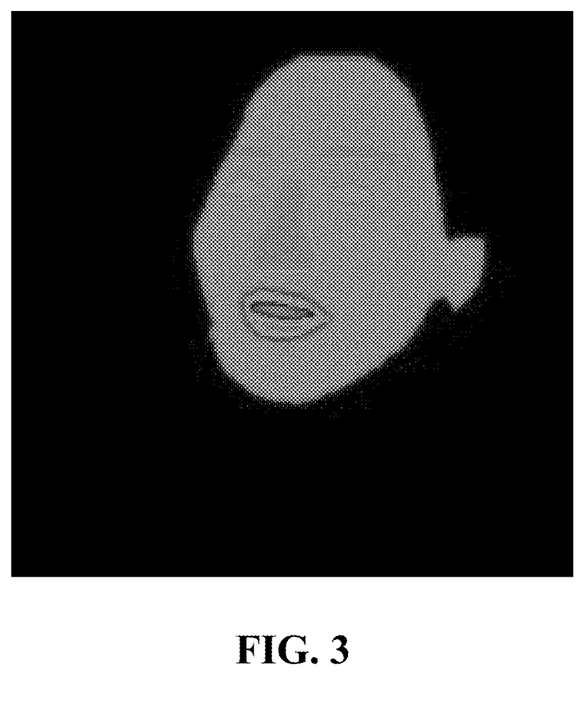
FIG. 3 is a schematic diagram of an image recognition method according to another embodiment of the present application.

In this embodiment, a skin detection area is obtained by using a human face detection model and a human face keypoint detection model, and the mean and variances of the skin detection area are normalized to eliminate the influence of illumination in different environments. Areas of the human facial five sense organs and the skin are segmented by using a facial five-sense-organs segmentation model, obtaining a skin detection mask as shown in FIG. 3.

In this embodiment, human face pixels are subjected to homogenization processing, and then pixel variances of the homogenized human face image are normalized, so as to be able to avoid a human face shadow that is caused by factors such as illumination and covering by glasses and would affect the accuracy of defect recognition, which produces good accuracy and robustness for human face images in different lighting environments.

In another embodiment of the present application, the inputting the marked human face image into a backbone network model and performing feature extraction, obtaining defect features of the marked human face image outputted by different convolutional neural network levels of the backbone network model, includes:

setting a priori box on the marked human face image in the convolutional neural network level of a target level, wherein the target level is one of the multiple levels in the convolutional neural network in the backbone network model, and the size of the priori box corresponds to the target level; and determining whether there are human facial defects in the priori box, and outputting a partial human face image in the priori box as a defect feature of the marked human face image outputted by the convolutional neural network level of the target level if it is determined that there are human facial defects in the priori box.

In this embodiment, multiple priori boxes may be set at the position of the human face image, and the size of the priori boxes corresponds to the level of the convolutional neural network. The higher the level of the convolutional neural network is, the larger the size of the priori box is; and the lower the level of the convolutional neural network is, the smaller the size of the priori box is.

In this embodiment, priori boxes may be set in different convolutional neural network levels, so that defect recognition is able to be performed in each convolutional neural network level, which improves the accuracy of facial defect recognition.

In another embodiment of the present application, the determining whether there are human facial defects in the priori box includes:

determining that the partial human face image in the priori box does not have human facial defects in a case that a human face part corresponding to the partial human face image in the priori box is a target part, wherein the target part is a part of the marked human facial five sense organs that does not have defects; and obtaining an image feature of the partial human face image in the priori box and then determining whether there are human facial defects based on the image feature of the partial human face image in the priori box in a case that the human face part corresponding to the partial human face image in the priori box is not the target part.

In this embodiment, the target part may be a part of the human facial five sense organs that does not have defects, such as parts like eyeballs that are obviously impossible to have skin defects.

In this embodiment, in view of the characteristic that skin defects are generally small, priori boxes of different sizes are set in different feature levels of a backbone network. A priori box is used to detect the size of a box target, which may be a rectangular box, and to detect the size of a defect and the initial position of a defect. A smaller priori box is set in a lower-level feature level, and a bigger priori box is set in a higher-level feature level. Priori boxes at lower levels are used to detect smaller targets, and priori boxes at higher levels are used to detect larger targets. A fixed offset is set for each priori box at the same time, so that the priori boxes are sufficient to cover all detection positions, so as to ensure that fine-grained skin defects are able to be detected.

In this embodiment, when determining whether there are human facial defects, target parts among the human facial five sense organs that are impossible to have defects are excluded, which can effectively reduce the workload of defect recognition, effectively improve recognition speed, and improve defect recognition efficiency.

In another implementation of the present application, the determining whether there are human facial defects based on the partial human face image in the priori box further includes:

moving the priori box by a set offset on the basis of the current position in a case that it is determined that the partial human face image in the priori box does not have human facial defects, and re-executing the step of determining whether there are human facial defects based on the partial human face image in the priori box.

In this embodiment, an offset of a corresponding size may be set for each priori box, and in a case that there is no defect at the position where the current priori box is located, the priori box may be moved and the area masked by the priori box is replaced for further determination.

Through the above implementation, it is possible to find all facial defects in the human face image can be found more comprehensively.

Figure 4:
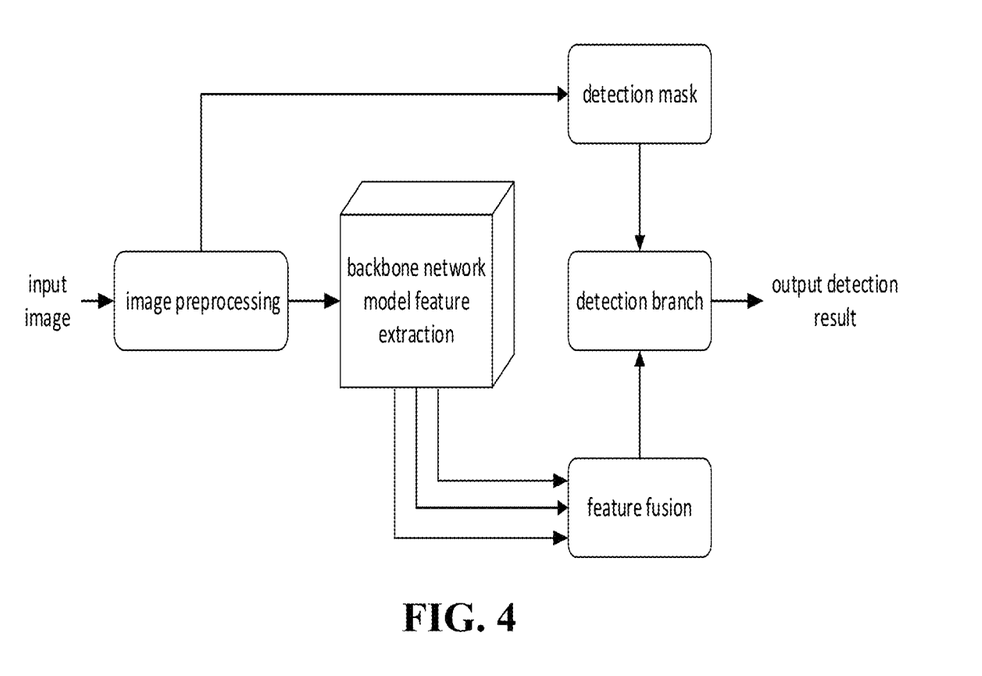
FIG. 4 is a schematic diagram of an image recognition method according to a specific example of the present application.

As an example, an overall framework of fine-grained detection of facial skin defects is shown in FIG. 4: after an input image is preprocessed, a preprocessed image is obtained, and the preprocessed image obtains a facial defect detection mask through human face key points, including information of the human facial five sense organs. The processed image is fed into a backbone network model for feature extraction. The backbone network model provides shared convolution parameters, outputs semantic information of different feature levels to a feature fusion layer, and fuses effects of features generated by different feature levels, fusing low-level semantic features and high-level semantic features. The fused features are fed into a detection branch, a detection mask is added, and supervised learning is conducted. The output results of the detection branch are numbers and positions of various types of skin defects. The entire framework forms a unified model, which can be trained as a whole from an input end to an output end.

In the example shown in FIG. 4, a feature fusion part is added into the basic backbone network model structure, that is, features of multiple scales in the basic network are combined so as to obtain relative-scale-invariant multi-scale features. This part may adopt, but is not limited to, common feature combination methods such as UNet (U-shaped network) and FPN (Feature Pyramid Networks), so as to ensure simplicity, ease of use, and scalability of a backbone network base and multi-scale features.

The basic network part of the backbone network model includes, but is not limited to, ResNet-34 (deep residual network-34), inception-v3 (founding network-v3), mobilenet-v2 (mobile neural network-v2), etc. This part may use any image classification network structure as a basis.

Based on the feature fusion and the detection mask, the detection branch outputs the positions of various types of defects, then deletes overlapping targets through a non-maximum suppression algorithm, and finally obtains the positions of three types of skin defects, spots, pimples, and moles, as well as the numbers of the various types of defects.

Through experimental testing, the image recognition method provided in the embodiment of the present application has a mole detection accuracy rate of 83.2%, a spot detection accuracy rate of 69.2%, and an acne detection accuracy rate of 54.5% on a test set. The detection accuracy of each of the three types of skin defects far exceeds competitors.

Figure 5:
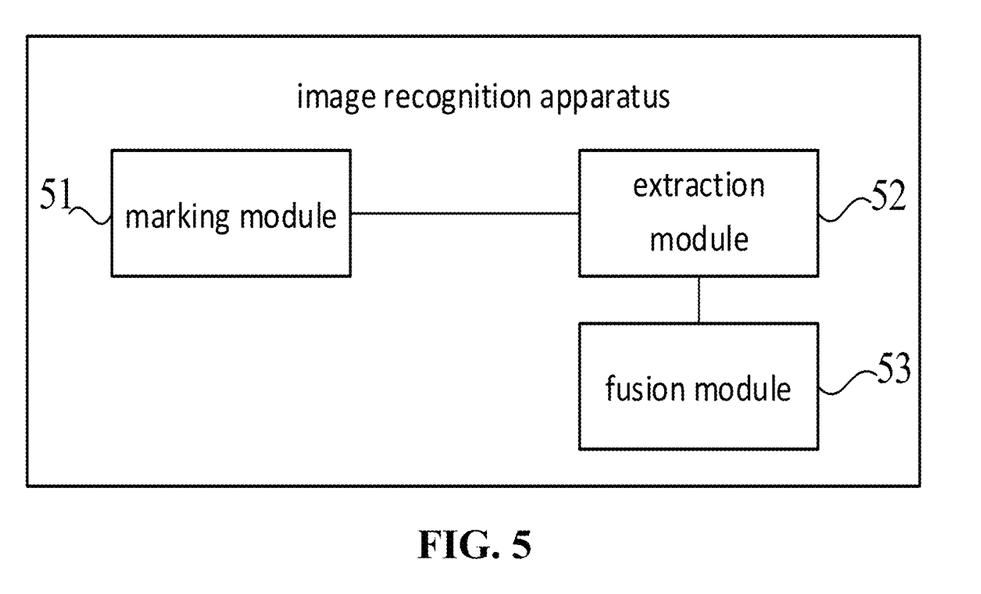
FIG. 5 is a schematic diagram of an image recognition apparatus according to an embodiment of the present application.

FIG. 5 is a block diagram of an image recognition apparatus according to an embodiment of the present application. The apparatus may include:
a marking module 51, configured for performing organ recognition on a human face image and mark positions of the human facial five sense organs in the human face image, obtaining a marked human face image;
an extraction module 52, configured for inputting the marked human face image into a backbone network model and perform feature extraction, obtaining defect features of the marked human face image outputted by different convolutional neural network levels of the backbone network model; and
a fusion module 53, configured for fusing the defect features at different levels that are located in a same area of the human face image, obtaining a defect recognition result of the human face image.

Figure 6:
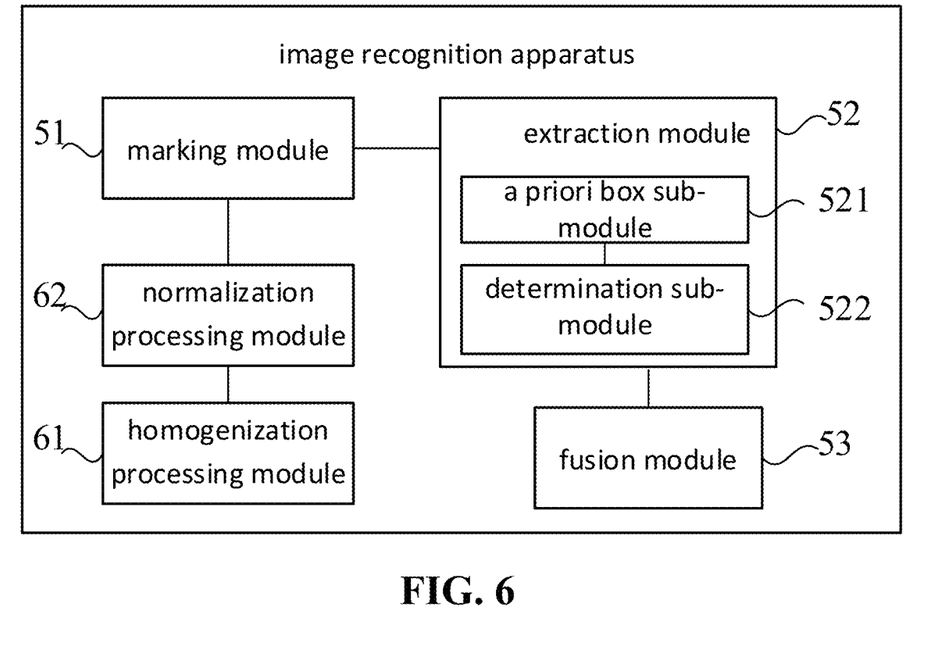
FIG. 6 is a schematic diagram of an image recognition apparatus according to another embodiment of the present application.

In one possible implementation, as shown in FIG. 6, the apparatus further includes:
a homogenization processing module 61, configured for performing homogenization processing on pixels of the human face image, obtaining a homogenized human face image; and
a normalization processing module 62, configured for performing normalization processing on pixel variances of the homogenized human face image, obtaining a normalized human face image.

In one possible implementation, the extraction module 52 includes:
a priori box sub-module 521, configured for setting the priori box on the marked human face image in the convolutional neural network level of a target level, wherein the target level is one of the multiple levels in the convolutional neural network in the backbone network model, and the size of the priori box corresponds to the target level; and
a determination sub-module 522, configured for determining whether there are human facial defects in the priori box and output a partial human face image in the priori box as a defect feature of the marked human face image outputted by the convolutional neural network level of the target level if it is determined that there are human facial defects in the priori box.

In one possible implementation, the determination sub-module is specifically configured for:

determining that the partial human face image in the priori box does not have human facial defects in a case that a human face part corresponding to the partial human face image in the priori box is a target part, wherein the target part is a part of the marked human facial five sense organs that does not have defects; and obtaining an image feature of the partial human face image in the priori box and then determine whether there are human facial defects based on the image feature of the partial human face image in the priori box in a case that the human face part corresponding to the partial face image in the priori box is not the target part.

In one possible implementation, the determination sub-module is further configured for moving the priori box by a set offset on the basis of the current position in a case that it is determined that the partial human face image in the priori box does not have human facial defects, and re-execute the step of determining whether there are human facial defects based on the partial human face image in the priori box.

Specifically, the determination sub-module determines whether there are human facial defects based on the partial human face image in the priori box, which includes: moving the priori box by a set offset on the basis of the current position in a case that it is determined that the partial human face image in the priori box does not have human facial defects, and re-executing the step of determining whether there are human facial defects based on the partial human face image in the priori box.

According to embodiments of the present application, the present application further provides an electronic device and a readable storage medium.

Figure 7:
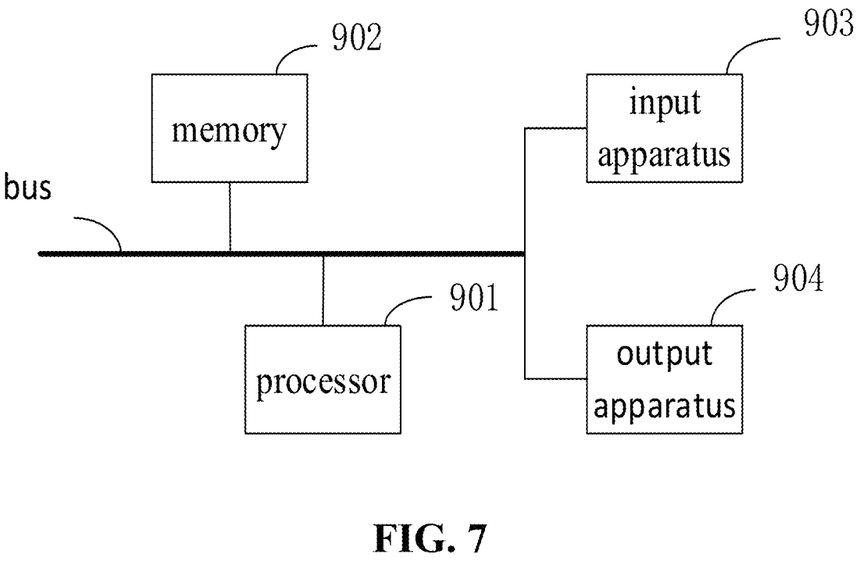
FIG. 7 is a block diagram of an electronic device used to implement an image recognition method according to an embodiment of the present application.

As shown in FIG. 7, it is a block diagram of an electronic device for implementing the image recognition method according to an embodiment of the present application. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or claimed herein.

As shown in FIG. 7, the electronic device includes: one or more processors 901, a memory 902, and interfaces for connecting various components, which include a high-speed interface and a low-speed interface. The various components are connected to each other using different buses and may be installed on a common motherboard or installed in other ways as needed. The processor may process instructions executed within the electronic device, including instructions stored in or on the memory to display graphic information of GUI on an external input/output apparatus (such as a display apparatus coupled to an interface). In other embodiments, if necessary, multiple processors and/or multiple buses may be used with multiple memories. Similarly, multiple electronic devices may be connected, and each device provides a part of necessary operations (for example, as a server array, a group of blade servers, or a multi-processor system). One processor 901 is taken as an example in FIG. 7.

The memory 902 is the non-transitory computer-readable storage medium provided by the present application. Here, the memory stores instructions executable by at least one processor, so that the at least one processor performs the image recognition method provided by the present application. The non-transitory computer-readable storage medium of the present application stores computer instructions, which are used to cause the computer to execute the image recognition method provided by the present application.

As a non-transitory computer-readable storage medium, the memory 902 may be used to store non-transitory software programs, non-transitory computer executable programs and modules, such as program instructions/modules (for example, the marking module 51, the extraction module 52, and the fusion module 53 shown in FIG. 5) corresponding to the image recognition method in embodiments of the present application. The processor 901 executes various functional applications and data processing of the server by executing the non-transitory software programs, instructions, and modules that are stored in the memory 902, that is, implements the image recognition method in the foregoing method embodiments.

The memory 902 may include a storage program area and a storage data area, wherein the storage program area may store an operating system and application programs required by at least one function; the storage data area may store the data created based on the use of a video encoding electronic device. Moreover, the memory 902 may include a high-speed random access memory, and may also include a non-transitory memory, such as at least one magnetic disk storage device, a flash memory device, or other non-transitory solid-state storage devices. In some embodiments, the memory 902 may optionally include memories provided remotely with respect to the processor 901, and these remote memories may be connected to the video encoding electronic device via a network. Examples of the aforementioned network include, but are not limited to, the Internet, a corporate intranet, a local area network, a mobile communication network, and combinations thereof.

The electronic device for the image recognition method may further include: an input apparatus 903 and an output apparatus 904. The processor 901, the memory 902, the input apparatus 903, and the output apparatus 904 may be connected through a bus or in other ways. In FIG. 7, connection through a bus is taken as an example.

The input apparatus 903, such as a touch screen, a keypad, a mouse, a trackpad, a touchpad, an indicating rod, one or more mouse buttons, a trackball, a joystick, etc., may receive input numeric or character information and generate key signal inputs related to user settings and function control of the video coding electronic device. The output apparatus 904 may include a display device, an auxiliary lighting apparatus (for example, LED), a tactile feedback apparatus (for example, a vibration motor), etc. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may include: implementation in one or more computer programs, which may be executed and/or interpreted on a programmable system including at least one programmable processor, which may be an application specific or general-purpose programmable processor that may receive data and instructions from, and transmit data and instructions to, a storage system, at least one input apparatus, and at least one output apparatus.

These computation programs (also referred to as programs, software, software applications, or codes) include machine instructions of programmable processors, and these computation programs can be implemented by using a high-level process and/or object-oriented programming language, and/or an assembly/machine language. As used herein, the terms "machine-readable medium" and "computer-readable medium" refer to any computer program product, device, and/or apparatus (for example, a magnetic disk, an optical disk, a memory, a programmable logic devices (PLD)) used to provide machine instructions and/or data to a programmable processor, including a machine-readable medium that receives machine instructions as machine-readable signals. The term "machine-readable signal" refers to any signal used to provide machine instructions and/or data to a programmable processor.

In order to provide interactions with a user, the systems and technologies described herein may be implemented on a computer that has: a display device (for example, CRT (Cathode Ray Tube) or LCD (liquid crystal display) monitor) for displaying information to the user; and a keyboard and pointing device (for example, a mouse or a trackball) through which the user may provide input to the computer. Other types of apparatuses may also be used to provide interactions with a user; for example, the feedback provided to a user may be any form of sensory feedback (for example, visual feedback, auditory feedback, or tactile feedback); and input from a user may be received using any form (including acoustic input, voice input, or tactile input).

The systems and technologies described herein may be implemented in a computing system (for example, as a data server) including back-end components, or a computing system (for example, an application server) including middleware components, or a computing system (for example, a user computer having a graphical user interface or a web browser through which the user may interact with the implementation of the systems and technologies described herein) including front-end components, or a computing system including any combination of such back-end components, middleware components or front-end components. The components of the system may be connected to each other by any form or medium of digital data communication (for example, a communication network). Examples of communication networks include: a Local Area Network (LAN), a Wide Area Network (WAN), and the Internet.

The computer system may include a client and a server. The client and the server are generally far away from each other and typically interact through a communication network. The client-server relationship is generated by computer programs that run on respective computers and have a client-server relationship with each other.

Embodiments of the present application design an image recognition method for fine-grained detection of skin defects from an input end to an output end, which can simultaneously output, in parallel, the numbers and positions of three types of facial skin defects (spots, pimples, and moles), greatly save system detection time, and improve detection efficiency.

At the same time, embodiments of the present application design a feature fusion layer, in which low-level semantic features and high-level semantic features of the network are fully fused after the backbone network model outputs defect features of an image, which greatly improves detection accuracy and robustness, and skin defects can also be detected accurately in a natural environment, which greatly enriches use scenarios of the system and makes the system more expandable and scalable.

Embodiments of the present application further design a fine-grained skin defect detection structure, in which in view of the characteristic that some skin defects are very minuscule, a smaller priori box is set in a low feature level, and a fixed offset is set for each priori box, so that the detection model can detect fine-grained skin defects of one pixel.

It should be understood that various forms of processes shown above may be used to reorder, add, or delete steps. For example, respective steps described in the present application may be executed in parallel, or may be executed sequentially, or may be executed in a different order, as long as the desired result of the technical solution disclosed in the present application can be achieved, no limitation is made herein.

The foregoing specific embodiments do not constitute a limitation on the protection scope of the present application. Those skilled in the art should understand that various modifications, combinations, sub-combinations, and substitutions may be made according to design requirements and other factors. Any modification, equivalent replacement, or improvement made within the spirit and principle of the present application shall fall within the protection scope of the present application.

What is claimed is:

1. An image recognition method, comprising:
   performing organ recognition on a human face image and marking positions of human facial five sense organs in the human face image, obtaining a marked human face image;
   inputting the marked human face image into a backbone network model and performing feature extraction, obtaining defect features of the marked human face image outputted by different convolutional neural network levels of the backbone network model; and
   fusing the defect features of different levels that are located in a same area of the human face image, obtaining a defect recognition result of the human face image,
   wherein the inputting the marked human face image into a backbone network model and performing feature extraction, obtaining defect features of the marked human face image outputted by different convolutional neural network levels of the backbone network model, comprises:
   setting a priori box on the marked human face image in the convolutional neural network level of a target level, wherein the target level is one of the multiple levels in the convolutional neural network in the backbone network model, and the size of the priori box corresponds to the target level; and
   determining whether there are human facial defects in the priori box, and outputting a partial human face image in the priori box as a defect feature of the marked human face image outputted by the convolutional neural network level of the target level if it is determined that there are human facial defects in the priori box.

2. The method of claim 1, wherein prior to the performing organ recognition on a human face image, the method further comprises:
   performing homogenization processing on pixels of the human face image, obtaining a homogenized human face image; and performing normalization processing on pixel variances of the homogenized human face image, obtaining a normalized human face image.

3. The method of claim 1, wherein the determining whether there are human facial defects in the priori box comprises:

determining that the partial human face image in the priori box does not have human facial defects in a case that a human face part corresponding to the partial human face image in the priori box is a target part, wherein the target part is a part of the marked human facial five sense organs that does not have defects; and obtaining an image feature of the partial human face image in the priori box and then determining whether there are human facial defects based on the image feature of the partial human face image in the priori box in a case that the human face part corresponding to the partial human face image in the priori box is not the target part.

4. The method of claim 3, wherein the determining whether there are human facial defects based on the partial human face image in the priori box further comprises:

moving the priori box by a set offset on the basis of the current position in a case that it is determined that the partial human face image in the priori box does not have human facial defects and re-executing the step of determining whether there are human facial defects based on the partial human face image in the priori box.

5. An image recognition apparatus, comprising:

a processor and a memory for storing one or more computer programs executable by the processor, wherein when executing at least one of the computer programs, the processor is configured to perform operations comprising:

performing organ recognition on a human face image and mark positions of the human facial five sense organs in the human face image, obtaining a marked human face image;

inputting the marked human face image into a backbone network model and perform feature extraction, obtaining defect features of the marked human face image outputted by different convolutional neural network levels of the backbone network model; and fusing the defect features of different levels that are located in a same area of the human face image, obtaining a defect recognition result of the human face image, wherein when executing at least one of the computer programs, the processor is further configured to perform operations comprising:

setting the priori box on the marked human face image in the convolutional neural network level of a target level, wherein the target level is one of the multiple levels in the convolutional neural network in the backbone network model, and the size of the priori box corresponds to the target level; and determining whether there are human facial defects in the priori box and output a partial human face image in the priori box as a defect feature of the marked human face image outputted by the convolutional neural network level of the target level if it is determined that there are human facial defects in the priori box.

6. The apparatus of claim 5, wherein when executing at least one of the computer programs, the processor is further configured to perform operations comprising:

performing homogenization processing on pixels of the human face image, obtaining a homogenized human face image; and performing normalization processing on pixel variances of the homogenized human face image, obtaining a normalized human face image.

7. The apparatus of claim 5, wherein when executing at least one of the computer programs, the processor is further configured to perform operations comprising:

determining that the partial human face image in the priori box does not have human facial defects in a case that a human face part corresponding to the partial human face image in the priori box is a target part, wherein the target part is a part of the marked human facial five sense organs that does not have defects; and obtaining an image feature of the partial human face image in the priori box and then determine whether there are human facial defects based on the image feature of the partial human face image in the priori box in a case that the human face part corresponding to the partial human face image in the priori box is not the target part.

8. The apparatus of claim 7, wherein when executing at least one of the computer programs, the processor is further configured to perform operations comprising: moving the priori box by a set offset on the basis of the current position in a case that it is determined that the partial human face image in the priori box does not have human facial defects and re-execute the step of determining whether there are human facial defects based on the partial human face image in the priori box.

9. A non-transitory computer-readable storage medium having computer instructions stored therein, wherein the computer instructions, when executed by a computer, cause the computer to perform the method according to claim 1.

10. A non-transitory computer-readable storage medium having computer instructions stored therein, wherein the computer instructions, when executed by a computer, cause the computer to perform the method according to claim 2.

11. A non-transitory computer-readable storage medium having computer instructions stored therein, wherein the computer instructions, when executed by a computer, cause the computer to perform the method according to claim 3.

12. A non-transitory computer-readable storage medium having computer instructions stored therein, wherein the computer instructions, when executed by a computer, cause the computer to perform the method according to claim 4.

* * * * *

UNITED STATES PATENT AND TRADEMARK OFFICE
CERTIFICATE OF CORRECTION

| | | |
|---|---|---|
| PATENT NO. | : 11,756,332 B2 | Page 1 of 1 |
| APPLICATION NO. | : 17/208568 | |
| DATED | : September 12, 2023 | |
| INVENTOR(S) | : Zhizhi Guo et al. | |

It is certified that error appears in the above-identified patent and that said Letters Patent is hereby corrected as shown below:

On the Title Page

For the Assignee:
Add -- Beijing (CN) -- after "Beijing Baidu Netcom Science and Technology Co., Ltd."

Signed and Sealed this
Ninth Day of January, 2024

Katherine Kelly Vidal
*Director of the United States Patent and Trademark Office*